(12) United States Patent
Brust et al.

(10) Patent No.: US 8,314,364 B2
(45) Date of Patent: Nov. 20, 2012

(54) METHOD FOR OPERATING AN ELECTRICAL AUXILIARY HEATER IN A MOTOR VEHICLE

(75) Inventors: Jürgen Brust, Lorch (DE); Rolf Merte, Heidelberg (DE); Klaus Lehmann, Oberderdingen (DE); Andreas Mulczet, Affalterbach (DE)

(73) Assignee: BERU Aktiengesellschaft, Ludwigsburg (DE)

( * ) Notice: Subject to any disclaimer, the term of this patent is extended or adjusted under 35 U.S.C. 154(b) by 393 days.

(21) Appl. No.: 12/311,868

(22) PCT Filed: Oct. 12, 2007

(86) PCT No.: PCT/EP2007/008862
§ 371 (c)(1),
(2), (4) Date: Aug. 9, 2010

(87) PCT Pub. No.: WO2008/046558
PCT Pub. Date: Apr. 24, 2008

(65) Prior Publication Data
US 2010/0288745 A1   Nov. 18, 2010

(30) Foreign Application Priority Data

Oct. 18, 2006 (DE) .......................... 10 2006 049 148

(51) Int. Cl.
*B60L 1/04* (2006.01)
(52) U.S. Cl. ......................................... 219/205; 237/28
(58) Field of Classification Search ................. 219/205; 237/28
See application file for complete search history.

(56) References Cited

U.S. PATENT DOCUMENTS

| | | | |
|---|---|---|---|
| 4,504,732 A * | 3/1985 | Bube et al. | 219/497 |
| 4,701,596 A * | 10/1987 | Schirmer et al. | 219/483 |
| 5,130,659 A | 7/1992 | Sloan | |
| 6,083,369 A * | 7/2000 | Tanigawa | 204/424 |
| 2001/0025889 A1 | 10/2001 | Salberg | |
| 2005/0003710 A1 | 1/2005 | Congdon et al. | |
| 2005/0109051 A1 | 5/2005 | Heinle | |
| 2006/0112695 A1 | 6/2006 | Neubauer et al. | |
| 2006/0208739 A1 | 9/2006 | Schiller et al. | |

FOREIGN PATENT DOCUMENTS

| | | |
|---|---|---|
| CN | 1448285 A | 10/2003 |
| DE | 43 15 379 C1 | 4/1994 |
| DE | 197 12 342.2 A1 | 10/1998 |
| DE | 199 12 764 A1 | 9/2000 |
| DE | 101 04 056 A1 | 8/2002 |
| DE | 103 55 396 A1 | 6/2005 |
| DE | 10 2004 058 693 A1 | 6/2006 |
| EP | 1 666 284 A2 | 10/2005 |
| FR | 2 818 197 A1 | 6/2002 |

* cited by examiner

*Primary Examiner* — Eugene Lee

(57) ABSTRACT

The invention relates to a method for operating an electric add-heater in a motor vehicle having at least one rechargeable electrochemical cell as a power source and an electric generator which is connected with the cell and is driven by a drive engine of the motor vehicle and by which an electric add-heater can be supplied with current when the drive engine is running.

It is provided according to the invention that in case of need the add-heater can be supplied with current even when no current is supplied by the generator, by switching over the add-heater to at least one electrochemical cell as a power source, monitoring the charging condition of at least one electrochemical cell, and interrupting the power supply of the electric add-heater realized by the at least one monitored electrochemical cell again when the charging condition of the at least one monitored electrochemical cell has dropped below a lower limit value.

16 Claims, 2 Drawing Sheets

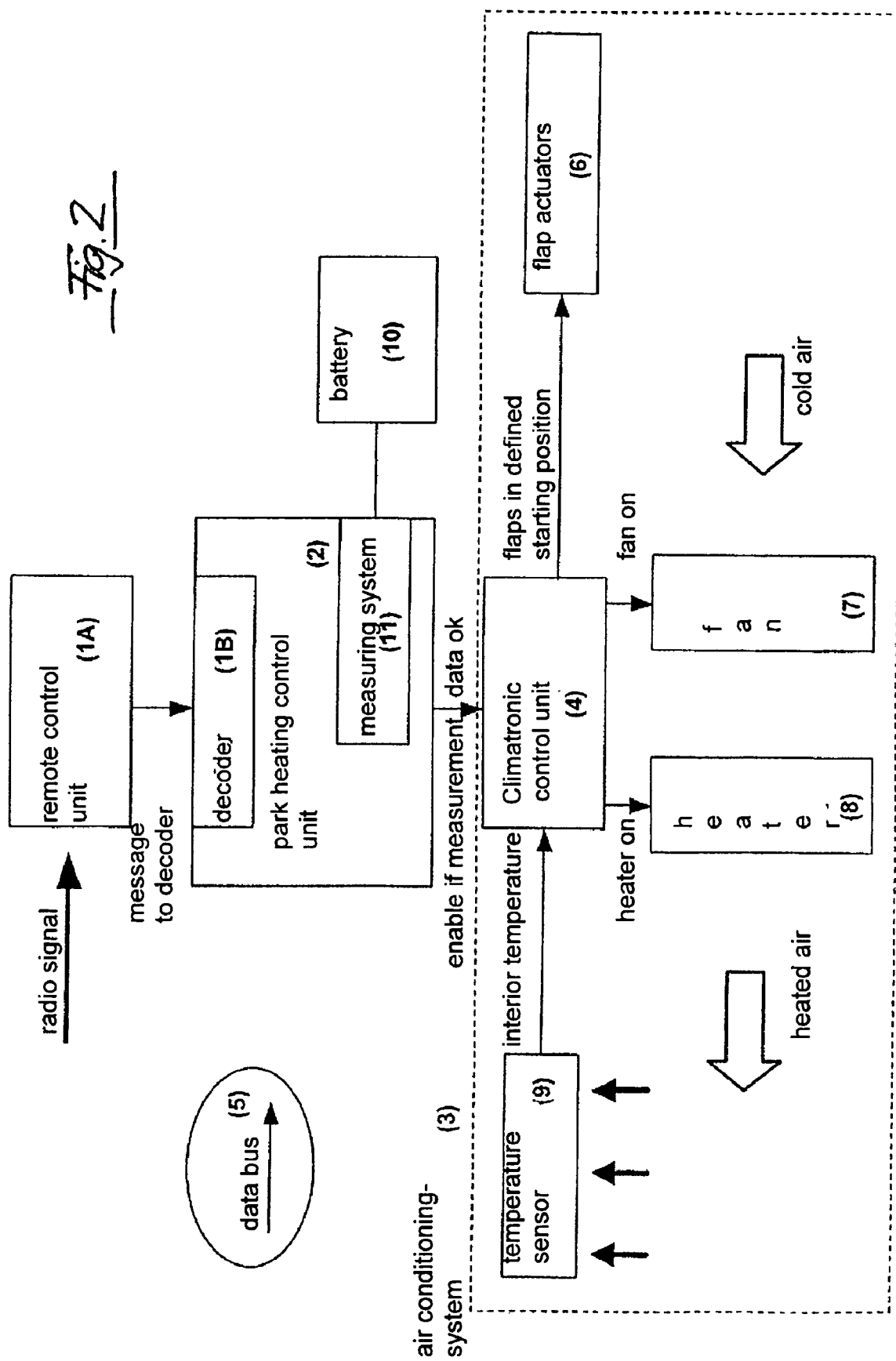

METHOD FOR OPERATING AN ELECTRICAL AUXILIARY HEATER IN A MOTOR VEHICLE

The present invention relates to a method having the features defined in the preamble of claim 1. Such a method has been known from DE 103 55 396 A1. The known method is used to operate air conditioning systems with electric auxiliary heating, hereinafter shortly referred to as electric add-heaters.

Modern diesel engines have a thermal/mechanical efficiency so high that their waste heat no longer suffices to quickly heat up the vehicle interior. To remedy that problem it has been known to install electric add-heaters, which mostly use PTC elements as heating elements. So long as the engine is running, the required electric current is supplied by the vehicle generator. When the engine is shut down, current no longer is supplied by the generator. In order to allow the interior of a vehicle to be heated even with the engine at rest, auxiliary heating systems have been in use. Conventional auxiliary heating systems burn the fuel available in the vehicle, i.e. diesel fuel or gasoline, thereby heating air that is blown into the interior of the vehicle by a blower, or else heating water present in the heater circuit of the vehicle that transmits its heat to air via a heat exchanger, the air being then directed into the interior of the vehicle via a blower. Such conventional auxiliary heating systems are comparatively expensive, require ample space, produce harmful exhaust gases, sometimes even smoke, and can therefore be run practically under open air conditions only, not in a private garage, in a public parking garage or in an underground car park.

From DE 103 55 396 A1 is has been known to use a PTC add-heater also as auxiliary heating, by supplying it with current from the public AC mains. However, as PTC heaters normally operate in vehicles at 12 V direct voltage, they cannot easily be operated at 230 V alternating current. DE 103 55 396 A1 proposes in this respect that the PTC elements, which are connected in parallel when the car is traveling, should be connected in series for use as an auxiliary heating, for example 16 PTC elements connected in series, so as to distribute the mains voltage of 230 V equally over the 16 PTC elements. It is a disadvantage of that solution that such an electric heater can be used as an auxiliary heating only provided an electric outlet is at hand. However, this will not be the case in most of the cases, especially when the vehicle is parked outdoors, while the need for a properly working auxiliary heating makes itself felt most acutely especially in those cases.

From DE 103 55 397 A1, there have been known air conditioning systems with auxiliary air conditioning units provided with a small diesel engine as auxiliary drive. Those systems are, however, relatively noisy, heavy, expensive, and they also produce undesirable harmful exhaust gases. To remedy this situation, DE 103 55 397 A1 proposes to install an auxiliary energy supply or emergency energy supply—not explained in detail—which is supplied from the public AC mains via an electric motor, and by which excessive energy can be made available to other electric consumers in the vehicle via the electric motor which then acts as a generator. That proposal has similar disadvantages as the proposal known from DE 103 55 396 A1.

DE 199 12 764 A1 describes a mobile heater for heating the interior of motor vehicles, which avoids the necessity to have an electric mains outlet at hand in that it contains a storage medium, for example fire bricks that are heated at home and whose heat is then given off in the vehicle by a blower which latter is arranged in the mobile heater and is operated using current from the vehicle battery. Such a mobile heater is expensive to produce, awkward to handle and bulky so that it is not suited for being carried along at desire.

Now, it is the object of the present invention to provide a simpler and less expensive way of heating a vehicle at rest.

SUMMARY OF THE INVENTION

That object is achieved by a method having the features defined in claim 1. Advantageous further developments of the invention are the subject-matter of the sub-claims.

The invention provides that, in a motor vehicle having at least one rechargeable electrochemical cell as a power source and an electric generator which is connected with the cell and is driven by a drive engine of the motor vehicle and by which generator an electric add-heater can be supplied with current when the drive engine is running, the add-heater may be supplied with current, if necessary, even when no current is supplied by the generator. In that case, the add-heater is switched over to at least one electrochemical cell as a power source, the charging condition of at least one electrochemical cell is monitored, and the power supply of the electric add-heater realized by the at least one monitored electrochemical cell is interrupted again when the charging condition of the at least one monitored electrochemical cell has dropped below a lower limit value. It is possible in this way to produce the desired heat also with the motor vehicle at rest, when no current is supplied by the electric generator driven by the drive engine of the motor vehicle, to the extent this is feasible in view of the charging condition of the electrochemical cell and provided a predefined residual charge is retained. Suited for use as such electrochemical cells are, for example, lead accumulators, nickel-metal hydride batteries, lithium ion accumulators and fuel cells.

The invention provides substantial advantages:
The invention can be realized with minimum input.
Many motor vehicles already provide the possibility to monitor the charging condition of an electrochemical cell. In that case, the invention can be realized by merely adapting the control means, anyway present in the vehicle for the electric add-heater and may-be for a ventilating system and/or an air-conditioning system, in the manner proposed by the invention so that they are capable of additionally performing the method according to the invention.
Today, control systems in motor vehicles predominantly use electronic arithmetic modules, comprising for example a microprocessor or a microcontroller or an application-specific integrated circuit (ASIC). In those cases, the invention can be realized by adapting the programming of the arithmetic modules concerned. There is no need for additional hardware in those cases, except for a sensor serving to monitor the charging condition of an electrochemical cell that may be necessary if the motor vehicle should not be equipped with such a sensor in a particular case.
Considering that the method according to the invention can be realized separately, or essentially by suitable adaptation of software, it is easy to specifically adapt the invention to different vehicle types as requested by the vehicle manufacturer. The invention therefore gives the user or the supplier a higher degree of flexibility in respect of specific implementations of the invention.
The electric add-heater present in the vehicle may serve a dual function: When the vehicle is at rest, it may serve as auxiliary heating, when the vehicle is traveling it may serve as add-heater which is supplied with current from the vehicle generator—from the "alternator".

The invention can be realized at extremely low cost.

Due to the dual use of an existing add-heater, equipment space and weight can be saved in the vehicle.

The disadvantages of a conventional fuel-burning auxiliary heating, such as harmful exhaust gases, development of harmful smoke, unpleasant smell, in case of a defect even a risk of fire, are avoided.

The possibility to use the electric add-heater as auxiliary heating, both at rest and when traveling, favors the use of such an add-heater in vehicles which are not yet equipped with an electric add-heater, whereby the sale of add-heaters can be increased which in turn has the result to make add-heaters cheaper because they can be produced more efficiently in larger numbers.

The invention is suited not only for vehicles with diesel engines, but also for vehicles with Otto engines, for vehicles with electric motors that are supplied with current by fuel cells, and also for vehicles with hybrid drive, i.e. a combination of an Otto or diesel engine with an electric motor supplied from fuel cells or modern batteries, such as nickel hydride batteries. Vehicles equipped with an electric motor as a drive that is supplied from fuel cells, are especially well suited for application of the invention because fuel cells are capable of supplying much more heating energy than a conventional lead accumulator which is available for operation of an add-heater as auxiliary heating in vehicles that are exclusively driven by an Otto engine or a diesel engine.

Claim 1 proposes that in case of need, when no current is supplied by the electric generator installed in the vehicle, the electric add-heater can be switched over to one or more electrochemical cells present in the vehicle as a current source. The electric generator may by the alternator usually present in any motor vehicle. However, that function may also be performed by any other generator that supplies current when the vehicle is traveling, but does not when the vehicle is at rest. In the case of a vehicle which is exclusively driven by an Otto engine or a diesel engine, the electrochemical cell to which the add-heater can be switched over when no current is supplied by the generator, is the vehicle battery normally described as starter battery because its main function consists in starting the internal combustion engine. The starter battery normally consists of a lead accumulator or another galvanic accumulator, from which electric current can be drawn at rest, provided this is permitted by its charging condition, and which is recharged by the generator—the "alternator"—when the vehicle is traveling. In a motor vehicle that is exclusively driven by one or more electric motors, or by one or more electric motors in combination with an Otto engine or a diesel engine (hybrid drive), with the at least one electric motor being supplied with current from fuel cells, the add-heater may be supplied with current from such fuel cells. In that case, the fuel cells constitute an electric cell in the meaning of the invention. Fuel cells that derive electric current from cold combustion of hydrogen are commonly known for driving motor vehicles. Vehicles equipped with a hybrid drive may, instead of using fuel cells, use rechargeable metal hydride batteries as a power source for the electric vehicle drive, especially nickel metal hydride batteries, or lithium accumulators. These, too, are electrochemical cells in the meaning of the invention.

The term charging condition of the electrochemical cell, that is monitored according to the invention, is to be understood as the electric charging condition of the battery, usually stated in ampere-hours, in the case of a starter battery, a metal hydride battery and a lithium ion accumulator. Related to a vehicle drive using fuel cells, the charging condition of the electric cell in the meaning of the invention is the fuel supply available for cold combustion in the fuel cells. To the extent vehicles are driven today via fuel cells, they use fuel cells that burn hydrogen. The hydrogen is carried along in the vehicle either in liquid gas flasks, in compressed-gas cylinders or in a solid storage medium based on a metal hydride, for example zirconium hydride. The hydrogen supply still available then constitutes the charging condition of the electrochemical cell in the meaning of the invention.

In the case of a vehicle, which is exclusively driven by an Otto engine or a diesel engine and in which only a starter battery is available for providing the power supply of the add-heater when the motor is switched off, the lower limit value of the charging condition is conveniently selected so that the residual charge of the battery will still be sufficient to ensure that the vehicle can be safely started.

In the case of a vehicle with fuel cell drive the lower limit value of the charging condition is conveniently selected so as to ensure that the residual hydrogen quantity will still be sufficient to allow the vehicle to reach a service station where the hydrogen supply can be filled up.

In the case of a vehicle with hybrid drive and fuel cell, the hydrogen supply can be completely used up in operating the add-heater as an auxiliary heating provided it is ensured that the fuel tank for the Otto engine or the diesel engine still contains sufficient fuel for the vehicle to reach the next service station.

In the case of a vehicle with hybrid drive with two battery systems, for example with a starter battery and a metal hydride battery, the battery charge may be completely used up in operating the add-heater as an auxiliary heating. Hybrid vehicles presently available on the market have two batteries, one 12 V starter battery and one 201.6 V Ni metal hydride battery for the electric motor. Preferably, the charge of the metal hydride battery is used up in that case while the starter battery is spared to maintain the startability of the vehicle.

The starting capability of a starter battery depends not only on the charging condition but also on the temperature. The colder the battery, the lower is the power that can be drawn from the battery. Preferably, the limit value of the charging state up to which power can be drawn from the battery for the add-heater is therefore made temperature-dependent. Preferably, this is done by measuring the temperature of the drive engine, especially the cooling water temperature. When the vehicle has been at rest for an extended period, the cooling water temperature and the battery temperature will be in balance with the outdoor temperature. When the engine has been at rest for a shorter time only and is still a little warm the cooling water temperature may differ from the battery temperature. But in this case as well the battery will still have some residual heat left from the preceding traveling operation, either because it has absorbed heat indirectly from the engine, or because it has been heated up by the charging operation. Measuring the temperature of the cooling water is of advantage in this case as well, on the one hand to ensure the starting capability of the battery and on the other hand to allow as much heating energy as possible to be drawn from the battery.

There is, however, also the possibility to specify the limit value of the charging condition of the starter battery without regard to the temperature so that the starting capability of the battery will be ensured even at the coldest temperature to be expected, for example at minus 30° Celsius. For determining such a temperature-dependent limit value one may fix it at a certain fraction of the nominal capacity of the battery. That determination is made by the vehicle manufacturer who may also specify a maximum heating time for the add-heater.

Modern vehicles are equipped with a radio-operated locking system. It is an advantageous further development of the invention, especially for such vehicles, to provide that the electric add-heater can be connected to the vehicle cell by a radio signal. One can then by a radio signal cause a vehicle, that had been parked outdoors overnight, to connect the add-heater to the electrochemical cell without having to leave one's home. A corresponding possibility is provided by vehicles equipped with a mobile radio system. In that case it is possible to transmit a telecommunications signal by which the electric add-heater will be connected to an electrochemical cell.

When the capacity of the battery or the hydrogen storage of a fuel cell drive, used for the add-heater, has not yet reached the selected lower limit value, the add-heater will be switched off conveniently either at the end of a pre-selected heating time or at the time a pre-selected threshold value of the interior temperature of the vehicle has been reached, in which case the temperature threshold value or the limit value of the heating time preferably can be pre-selected individually. To the extent it is permitted by the charging condition of the battery or of the hydrogen storage of a fuel cell drive, the temperature of the air in the vehicle may also be regulated to a preselected value so that a pre-selected temperature will be maintained even when the driver should come to the vehicle later than planned.

During operation of the add-heater as an auxiliary heating it is preferably operated as a closed air circuit heating. In that case, the air is just circulated within the vehicle interior, any air exchange with the environment is prevented. This is convenient in order to loose as little heating energy as possible to the environment.

BRIEF DESCRIPTION OF THE DRAWINGS

Further features and advantages will be apparent from the description of two embodiments with reference to the attached drawings which show, in the form of a block diagram, FIG. 1 the integration of the invention in existing components of the vehicle; and FIG. 2 the implementation of the invention using a separate control unit, and for the rest by integration into existing components of a vehicle.

DETAILED DESCRIPTION

Figure 1:
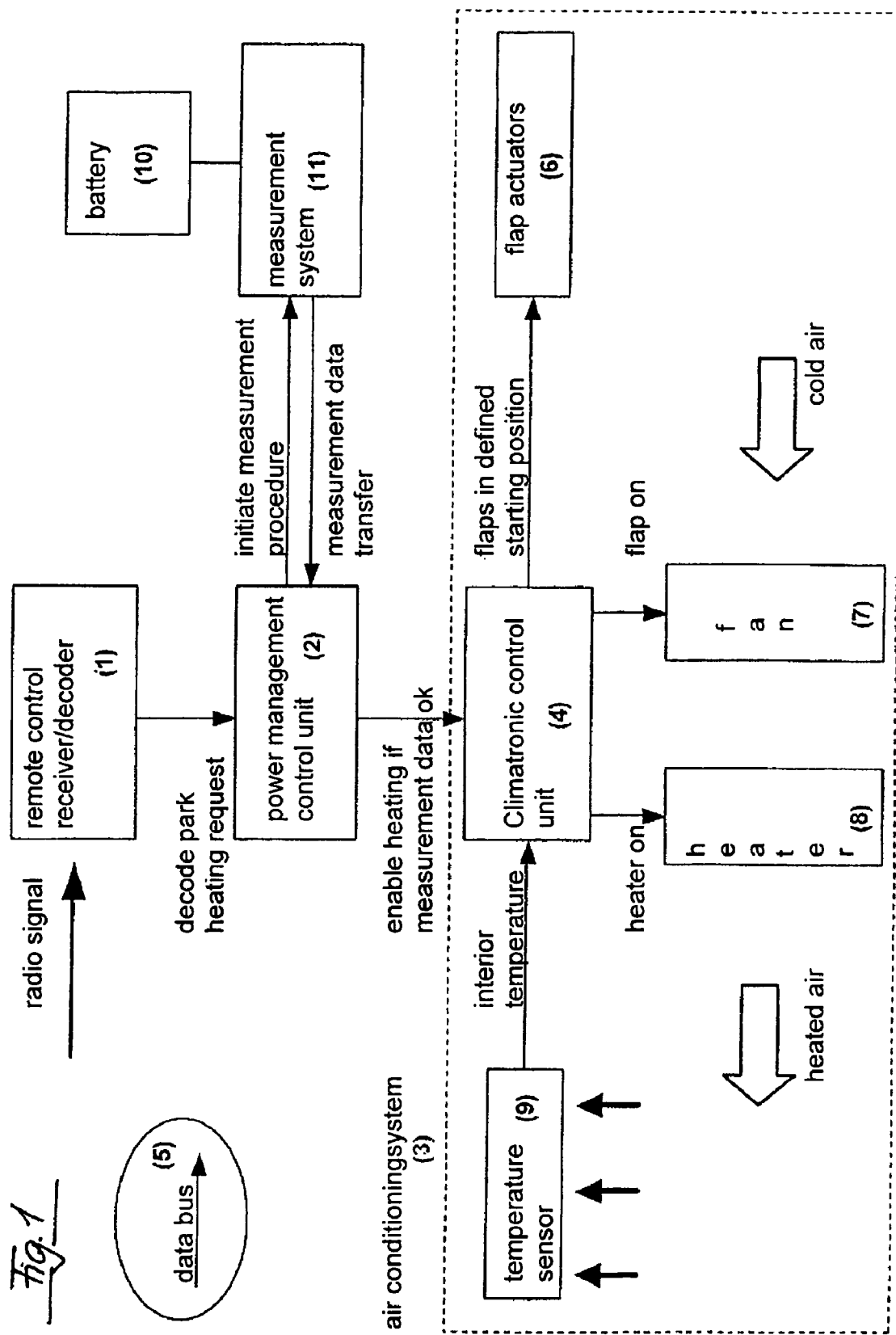

FIG. 1 shows, in the form of a block diagram, a radio-operated remote control receiver 1 with integrated decoder, a control unit 2 for power management tasks, for example for guaranteeing a sufficient charging state of the starter battery by priorized disconnection of high-current consumers and/or by an increase of the no-load engine running speed. FIG. 1 further shows a control unit 4 for an air-conditioning system 3 present in the vehicle, for flap actuators 6, for a fan 7 and for an add-heater 8. The control unit 4 receives signals from a temperature sensor 9 that responds to the temperature of the air in the vehicle. Further, there is provided a vehicle battery 10 the charging condition of which is monitored by a measuring system 11 (for example the IBS intelligent battery sensor from Hella), which is connected with the control unit 2 for power management. A data bus 5, for example a CAN bus or a LIN bus, provides the telecommunication link to other control units of the vehicle.

In traveling operation, the add-heater is supplied with current from the vehicle generator. The add-heater 8 can be switched on for that purpose by a radio signal that is received by the remote control receiver 1. The radio signal received is decoded in the remote control receiver 1 and is transmitted to the control unit 2 which then activates, or when the measuring system 11 is active continuously, inquires the measuring system 11. The measuring system 11 determines the charging condition of the battery 10. A suitable measuring system 11 is provided, for example, by the IBS intelligent battery sensor from Hella. The measuring system 11 transmits to the control unit 2 a signal that contains information on the charging condition of the battery 11. The control unit 2 determines the charging condition of the battery 11 from the signal received from the measuring system 11, and compares it with a limit value stored in the control unit 2. When the charging condition determined by the measuring system 11 is above the stored limit value, then the control unit 2 transmits a release signal to the control unit 4 of the air-conditioning system 3, which thereupon operates the flap actuators 6 to connect the air-conditioning 3 into the closed air circuit operation and switches on the add-heater 8 and the fan 7 by which the heat produced by the add-heater 8 is transported into the vehicle interior. The add-heater 8 is supplied with current in this case from the battery 10.

Park heating ends when the temperature sensor 9 signals to the control unit 4 of the air-conditioning system that a predetermined air temperature has been reached in the vehicle interior, but at the latest when the measuring system 11, being still active or being activated at regular intervals, signals to the control unit 2 a charging condition of the battery 10 that has dropped below the limit value stored in the control unit 2.

Alternatively, it is also possible to determine from the initially measured charging condition of the battery 10, in the power management control unit 2, that energy which can be drawn from the battery 10 until its charging condition will reach the limit value stored in the control unit 2. By measuring the current, battery voltage and time during operation as park heating it is possible to monitor the energy drawn from the battery 10 by the add-heater 8 and to switch off the add-heater 8 once the amount of energy, which had been calculated in advance from the initial charging condition of the battery 10 and the predefined limit value of its charging state and which is available for operation as engine independent heating, has been used up.

Based on the charging condition of the battery that has been determined in advance and on the predefined limit value of its charging condition, and knowing the battery voltage and the design-typical current consumption of the add-heater 8, the power management control unit 2 alternatively can calculate the period of time, after the add-heater 8 has been switched on, after which the predefined limit value of the charging condition of the battery 10 will probably be reached. Once the calculated heating time has been reached, the control unit 2 can then switch off the add-heater 8 and secure the residual charge of the battery 10 which in any case will suffice to start the engine.

In addition, it is possible to monitor the proper functioning of the components that are involved in the operation as park heating, and if a malfunction of any components should be determined, to switch off the add-heater 8 as a precautionary measure.

In the second embodiment illustrated in FIG. 2, identical components or components that correspond one to the other have been indicated by the same reference numeral as in the first embodiment. The second embodiment differs from the first embodiment in that the vehicle is equipped not with a conventional power management control unit 2 but with a special control unit 2 for operation of the add-heater 8 as engine independent park heating. The remote control receiver 1a contains no decoder for the radio signal that is to activate the operation of the add-heater 8 as an auxiliary heating; instead, the decoder 1b is integrated in the special control unit 2 for the operation as park heating. Further, the measuring system 11 for monitoring the charging condition of the battery 10 is integrated in that control unit 2. In that arrangement as well, the remote control receiver 1a, the battery 10 and the air-conditioning system 3 are conventional vehicle components that are capable of carrying out the method according to the invention by installation of the separate control unit 2 with decoder 1b and measuring system 11. The function of the second embodiment is completely identical to that of the first embodiment.

LIST OF REFERENCE NUMERALS

1 Remote control receiver with integrated decoder
1a Remote control receiver without decoder
1b Decoder
2 Control unit
3 Air-conditioning system
4 Control unit
5 Data bus
6 Flap actuator
7 Fan
8 Add-heater
9 Temperature sensor
10 Vehicle battery
11 Measuring system

What is claimed is:

1. Method for operating an electric add-heater in a motor vehicle having at least one rechargeable electrochemical cell as a power source and an electric generator which is connected with the cell and is driven by a drive engine of the motor vehicle and by which an electric add-heater can be supplied with current when the drive engine is running, the method comprising in case of need, supplying the add-heater with current even when no current is supplied by the generator by switching over the add-heater to at least one electrochemical cell as a power source, that the charging condition of at least one electrochemical cell is monitored, and that the power supply of the electric add-heater realized by the at least one monitored electrochemical cell is interrupted again when the charging condition of the at least one monitored electrochemical cell has dropped below a preselected limit value, the add-heater being switched into closed air circuit by operation of a flap actuator when the add-heater is switched to at least one electrochemical cell as a power source.

2. The method as defined in claim 1, wherein the temperature of the drive engine is measured and the limit value of the charging state of the monitored electrochemical cell is selected depending on the temperature so measured.

3. The method as defined in claim 2, wherein in the case of a water-cooled drive engine the cooling-water temperature is measured and the limit value of the charging state of the monitored electrochemical cell is selected depending on the cooling-water temperature so measured.

4. The method as defined in claim 1, wherein the limit value of the charging state of the monitored electrochemical cell is pre-selected so that the charge available in the monitored electrochemical cell, when the limit value of the charging condition is reached, will still be sufficient to start the internal combustion engine.

5. The method as defined in claim 1, wherein in the case of a motor vehicle that is exclusively driven by an Otto engine or a diesel engine, the limit value of the charging state of the monitored electrochemical cell is determined in accordance with the vehicle manufacturer's specifications.

6. The method as defined in claim 1, wherein the electric add-heater is switched to at least one electrochemical cell by a radio signal.

7. The method as defined in claim 1, wherein the electric add-heater is switched off before the limit value of the charging condition of the monitored electrochemical cell is reached when a temperature sensor, that responds to the temperature of the air in the vehicle interior, signals that a pre-selected temperature threshold has been exceeded.

8. The method as defined in claim 7, wherein the temperature threshold can be selected individually.

9. The method as defined in claim 1, wherein the electric add-heater is disconnected from the monitored electrochemical cell before the limit value of its charging condition has been reached when the heating time exceeds a pre-selected limit value.

10. The method as defined in claim 9, wherein the limit value of the heating time can be pre-selected individually.

11. The method as defined in claim 1, wherein the monitored electrochemical cell is an electric accumulator.

12. The method as defined in claim 11, wherein the electric accumulator is a starter battery.

13. The method as defined in claim 1, wherein the monitored electrochemical cell is a fuel cell.

14. The method as defined in any claim 1, wherein the monitored electrochemical cell is a metal hydride battery or a lithium ion accumulator.

15. The method as defined in claim 1, wherein the monitored electrochemical cell is a starter battery and another electrochemical cell, which is not monitored, is provided in addition to the starter battery.

16. The method as defined in claim 1, wherein the electric add-heater is operated as a closed air circuit when the drive engine is at rest.

* * * * *